(12) United States Patent
Grandin et al.

(10) Patent No.: US 6,633,230 B2
(45) Date of Patent: Oct. 14, 2003

(54) APPARATUS AND METHOD FOR PROVIDING IMPROVED STRESS THRESHOLDS IN NETWORK MANAGEMENT SYSTEMS

(75) Inventors: Ronan François Daniel Grandin, Edinburgh (GB); David James Stevenson, Edinburgh (GB); Andrew Hunter Gray, West Lothian (GB); Neil William Gray, Livingston (GB)

(73) Assignee: 3Com Corporation, Santa Clara, CA (US)

( * ) Notice: Subject to any disclaimer, the term of this patent is extended or adjusted under 35 U.S.C. 154(b) by 147 days.

(21) Appl. No.: 09/897,266

(22) Filed: Jul. 2, 2001

(65) Prior Publication Data

US 2002/0141337 A1 Oct. 3, 2002

(30) Foreign Application Priority Data

Feb. 21, 2001 (GB) .............................. 0104294

(51) Int. Cl.⁷ .............................. G08B 29/00
(52) U.S. Cl. ................... 340/506; 340/511; 370/252
(58) Field of Search .................... 340/309.16, 309.3, 340/511, 516, 521, 526, 870.07, 870.09; 370/252, 419, 463; 375/214, 345; 371/51.1, 57.1

(56) References Cited

U.S. PATENT DOCUMENTS

| | | | | |
|---|---|---|---|---|
| 5,434,872 A | * | 7/1995 | Petersen et al. ............ | 371/57.1 |
| 5,471,399 A | | 11/1995 | Tanaka et al. ............... | 364/491 |
| 5,615,323 A | | 3/1997 | Engel et al. ................. | 395/140 |
| 5,696,486 A | | 12/1997 | Poliquin et al. ............. | 340/506 |
| 5,732,094 A | * | 3/1998 | Petersen et al. ............ | 371/51.1 |
| 5,751,964 A | | 5/1998 | Ordanic et al. ........ | 395/200.54 |
| 5,819,028 A | | 10/1998 | Manghirmalani et al. ................. | 395/185.1 |
| 5,828,830 A | | 10/1998 | Rangaraian et al. ... | 395/185.01 |
| 5,923,247 A | | 7/1999 | Dowden et al. ............. | 340/506 |
| 6,040,834 A | | 3/2000 | Jain et al. ................... | 345/356 |
| 6,147,974 A | * | 11/2000 | Matsumoto et al. ........ | 370/252 |
| 6,167,032 A | * | 12/2000 | Allison et al. .............. | 370/252 |
| 6,438,184 B1 | * | 8/2002 | Nayler ........................ | 375/345 |

FOREIGN PATENT DOCUMENTS

| | | | | |
|---|---|---|---|---|
| EP | 0515296 A1 | 11/1992 | ........... | H04L/12/26 |
| EP | 0849910 A2 | 6/1998 | ........... | H04L/12/26 |
| EP | 1065894 A1 | 1/2001 | ............ | H04Q/3/00 |
| GB | 2271918 A | 4/1994 | ........... | H04L/12/26 |
| GB | 2286317 A | 8/1995 | ............. | H04L/1/24 |
| GB | 2333672 A | 7/1999 | ........... | H04L/12/26 |
| GB | 2350035 A | 11/2000 | ........... | H04L/12/26 |
| GB | 2362061 A | 11/2001 | ............ | H04Q/3/00 |
| GB | 2362062 A | 11/2001 | ............ | H04Q/3/00 |
| WO | WO 94/19888 | 9/1994 | ........... | H04L/12/24 |
| WO | WO 96/04755 | 2/1996 | ............ | H04Q/3/00 |
| WO | WO97/31451 | 8/1997 | ........... | H04L/12/24 |
| WO | WO 98/19470 | 5/1998 | ............ | H04Q/3/00 |
| WO | WO 00/13373 | 3/2000 | ........... | H04L/12/26 |
| WO | WO 00/47003 | 8/2000 | ............ | H04Q/3/00 |
| WO | WO 00/72514 | 11/2000 | ........... | H04L/12/24 |

OTHER PUBLICATIONS

S. Waldbusser, "Remote Network Monitoring Management Information Base", RFC 1757, Feb. 1995, pp. 1–91.

(List continued on next page.)

*Primary Examiner*—Van Trieu
(74) *Attorney, Agent, or Firm*—McDonnell Boehnen Hulbert & Berghoff

(57) ABSTRACT

A network management apparatus and method for determining an optimum threshold value for a monitored characteristic of a network is described. The optimum threshold value is determined by counting a number of previously received events generated from values for a monitored characteristic which were above or below an existing threshold value for the monitored characteristic, and determining the optimum threshold value in dependence on the counted number. An optimum threshold value is provided, which is tailored to suit the network concerned.

19 Claims, 2 Drawing Sheets

OTHER PUBLICATIONS

IEEE Standard for Information Technology, "Part 3: Carrier Sense Multiple Access with Collision Detection (CSMA/CD) Access Method and Physical Layer Specifications", 802.3, 2000, pp. i–1515.

Lenoir et al., "Real–Time Transmission Network Management and Operation Support System", Commutation & Transmission, vol. 12, No. 3, 1990, pp. 87–98.

Decker et al., "Definitions Of Managed Objects For Bridges", RFC: 1493, Jul. 1993, pp. 1–34.

McMaster et al., "Definitions Of Managed Objects For IEEE 802.3 Repeater Devices", RFC: 1516, Sep. 1993, pp. 1–40.

S. Waldbusser, "Remote Network Monitoring Management Information Base", RFC:1271, Nov. 1991, pp. 1–81.

McCloghrie et al., "Management Information Base For Network Management Of TCP/IP–Based Internets: MIB–II", RFC:1213, Mar. 1991, pp. 1–70.

IEEE Standard For Information Technology, "Part 2: Logical Link Control", 802.2, 1998, pp. i–239.

S. Waldbusser, "Remote Network Monitoring Management Information Base", RFC:2021, Jan. 1997, pp. 1–104.

* cited by examiner-

US 6,633,230 B2

APPARATUS AND METHOD FOR PROVIDING IMPROVED STRESS THRESHOLDS IN NETWORK MANAGEMENT SYSTEMS

BACKGROUND OF THE INVENTION

1. Field of the Invention

The present invention relates generally to an apparatus and method for the management of a network, and more particularly to a network management apparatus and method for monitoring the stress of a network, and generating events when high stress conditions are detected.

2. Description of the Related Art

The following description is concerned with a data communications network, and in particular a local area network (LAN). It will be appreciated, however, that the invention but has more widespread applicability to other managed communications systems including wide area networks (WANs) or wireless communications systems.

Networks typically comprise a plurality of computers, peripherals and other electronic devices capable of communicating with each other by sending and receiving data packets in accordance with a predefined network protocol. Each computer or other device on the network is connected by a port to the network media, which in the case of a LAN network may be coaxial cable, twisted pair cable or fibre optic cable. Each device on the network typically has hardware for media access control (MAC) with its own unique MAC address. Data packets are sent and received in accordance with the MAC protocol (e.g. CSMA/CD protocol as defined by the standard IEEE 802.2, commonly known as Ethernet). Data packets transmitted using the MAC protocol identify the source MAC address (i.e. the MAC address of the device sending the data packet) and the destination MAC address (i.e. the MAC address of the device for which the data packet is destined) in the header of the data packet.

A network is generally configured with core devices having a plurality of ports, which can be used to interconnect a plurality of media links on the network. Such devices include hubs, routers and switches which pass data packets received at one port to one or more of its other ports, depending upon the type of device. Such core devices can be managed or unmanaged.

A managed device is capable of monitoring data packets passing through its ports. For example, a managed device can learn the physical or MAC addresses of the devices connected to its ports by monitoring the source address of data packets passing through the respective ports. Identified source and destination addresses transmitted from or to a port of a managed network device, such as a router, hub, or switch, are stored in a respective "address table" associated with the port.

Managed devices additionally have the capability of communicating with each other using a management protocol such as the SNMP (Simple Network Management Protocol), as described in more detail below. Whilst the following description is concerned with the SNMP management protocol, the skilled person will appreciate that the invention is not limited to use with SNMP, but can be applied to managed networks using other network management protocols.

SNMP forms part of the TCP/IP protocol suite, which is a number of associated protocols developed for networks connected to the Internet. SNMP defines agents, managers and MIBs (where MIB is Management Information Base), as well as various predefined messages and commands for data communication. An agent is present in each managed network device and stores management data, responds to requests from the manager using the GETRESPONSE message and may send a TRAP message to the manager after sensing a predefined condition. A manager is present within the network management station of a network and automatically interrogates the agents of managed devices on the network using various SNMP commands such as GET and GETNEXT commands, to obtain information suitable for use by the network administrator, whose function is described below. A MIB is a managed "object" database which stores management data obtained by managed devices, and is accessible to agents for network management applications.

It is becoming increasingly common for an individual, called the "network administrator", to be responsible for network management, and his or her computer system or workstation is typically designated the network management station. The network management station incorporates the manager, as defined in the SNMP protocol, i.e. the necessary hardware, and software applications to retrieve data from MIBs by sending standard SNMP requests to the agents of managed devices on the network.

An example of a known network management software application capable of determining monitoring the stress of a network is the 3Com® Network Supervisor available from 3Com Corporation of Santa Clara, Calif., USA. This application, and similar applications, uses SNMP commands to retrieve relevant management data from managed network devices, and processes the data as described below.

A part of the network administrator's function is to identify and resolve problems occurring on the network, such as device or link malfunction or failure. In order to provide the network administrator with the necessary information to identify such problems, the network management application monitors the devices on the network. An example of such monitoring is described in co pending UK Patent Application No 9917993.9 entitled "Management System and Method for Monitoring Stress in a Network" in the name of the present applicant. In the system and method described in UK Patent Application No 9917993.9 the SNMP manager in the network management station requests the agents of managed network devices on the network to retrieve selected MIB data indicative of device and link operation, and performs tests for device activity and service availability. Such MIB data may relate to characteristics such as traffic activity or errors occurring at a particular port in the relevant network device. Tests may include sending ICMP Ping requests to each device on the network, or sending selected requests for services such as SMTP, NFS and DNS to servers, and monitoring the time taken to receive a response. The monitored parameters or characteristics are referred to herein as "stress metrics".

The network management application compares, for each stress metric, the retrieved data or test results against a corresponding threshold level for the stress metric. The threshold level is the level above (or below) which performance is considered to be unacceptable. For simplicity, the following description is based on a maximum threshold, that is, a threshold level above which performance is considered to be unacceptable. The skilled person will appreciate that for some stress metrics the threshold level could be a level below which performance is unacceptable. Default values for threshold levels of monitored stress metrics are typically preset by the application vendor, but may be adjusted by the network administrator.

Each time a threshold is exceeded, the application logs an "Event". The "Event log" lists each Event, and includes information such as the date and time of the Event, the identity of the device affected and the nature of the Event. The network administrator can then review the Event list to identify problems on the network.

It is important that the thresholds for the monitored stress metrics are chosen so that the number of Events presented in the Event log for review is minimised whilst still keeping the network administrator informed of Events which indicate genuine problems on the network. It can be difficult for the network administrator to choose a threshold level which will be exceeded only if genuine problems exist on his particular network. Accordingly, there is a need for a system and method which can be used to assist the network administrator in the task of setting the threshold levels.

In the present applicant's UK Patent Application number 0009050.6 entitled "Network Management Apparatus and Method for Monitoring Stress in a Network", a method is proposed to assist the network administrator in setting threshold levels. In the method the administrator moves the threshold value up or down and the program simulates the Events which would have been generated if the threshold had been set at the changed value using previously received stress values from the network devices. The administrator can use the simulated Event lists to select a threshold level which generates only significant Events.

A problem with the method proposed in UK Patent Application number 0009050.6 is that the network administrator must have sufficient knowledge of the nature and type of Events generated so that he or she can determine which simulated Event list produced by the method includes all significant Events but few, and preferably no, unimportant Events. It cannot assist the inexperienced network administrator who does not have this knowledge.

The present invention seeks to address this problem, and provide a method and apparatus which can be used by even the most inexperienced network administrator in setting threshold levels.

SUMMARY OF THE INVENTION

In accordance with a first aspect, the present invention provides a method for determining an optimum threshold value for a monitored characteristic of a managed network, the method comprising the steps of: for a preceding time period, counting a number of values for a monitored characteristic, received during the time period, which exceeded an existing threshold value for said monitored characteristic, and determining an optimum threshold value for the monitored characteristic in dependence on the number determined by the counting step.

The method of the present invention thus provides the user with a suggested optimum threshold value for a monitored characteristic based on the number of previously received monitored values for the characteristic. The network administrator does not need to have knowledge of the nature and type of Events in order to adjust the threshold setting for the monitored characteristic. By using previously received monitored values, the suggested optimum threshold level is specific to the particular network.

In accordance with a second aspect, the present invention provides a computer readable medium carrying a computer program for carrying out the method of the first aspect of the present invention.

In accordance with a third aspect, the present invention provides a network management apparatus for monitoring a network and for determining an optimum threshold value for a monitored characteristic of the network, the apparatus comprising: a processor configured to count the number of values for a monitored characteristic which exceeded an existing threshold value for said monitored characteristic, said values previously received during a preceding time period, and configured to determine an optimum threshold value for the monitored characteristic in dependence on the number determined by the counting step.

Other preferred features of the present invention will be apparent from the following description and accompanying claims.

BRIEF DESCRIPTION OF THE DRAWINGS

Embodiments of the present invention will now be described, by way of example, with reference to the accompanying drawings, in which.

DETAILED DESCRIPTION OF THE PREFERRED EMBODIMENTS

Figure 1:
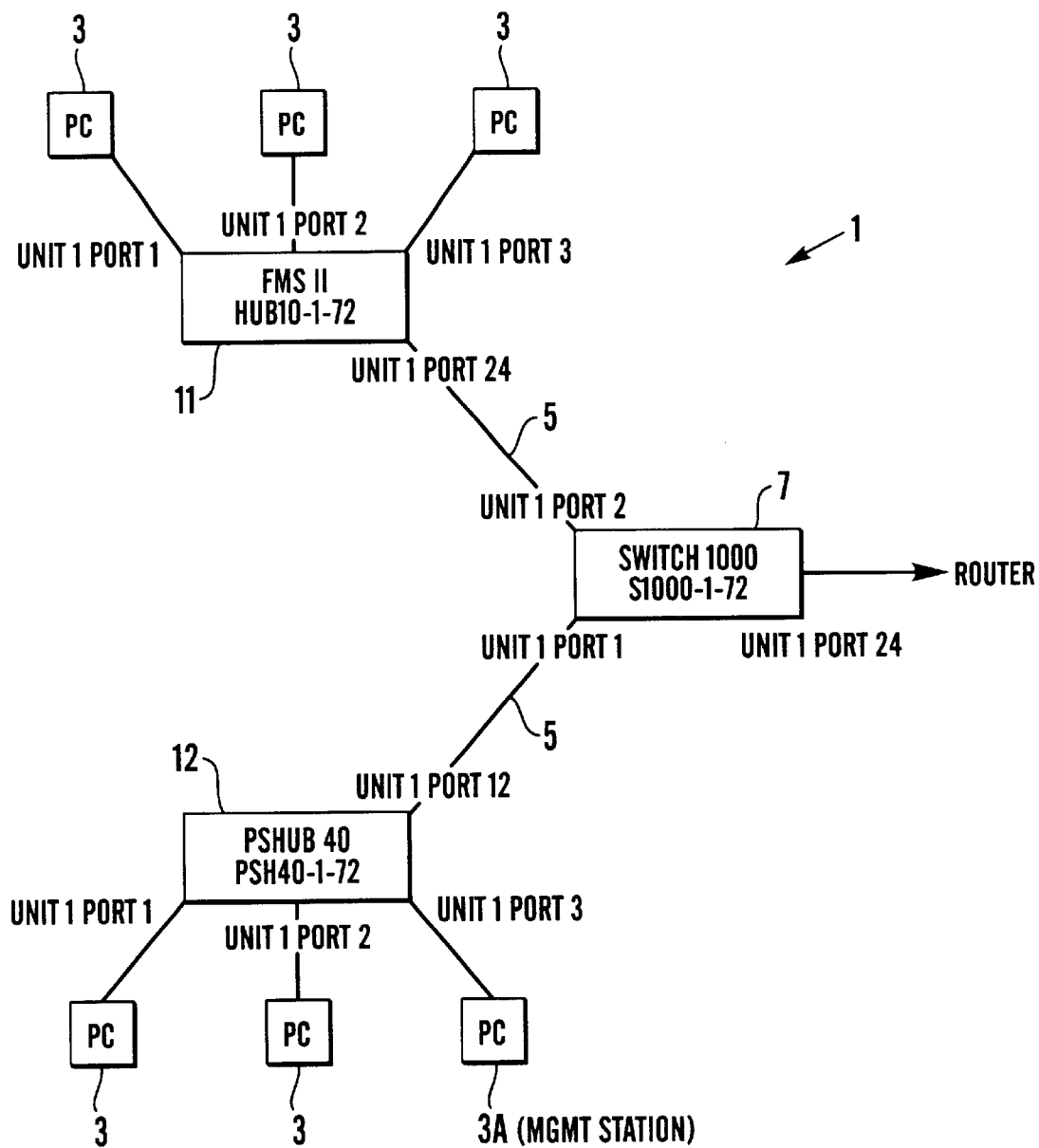
FIG. 1 is a block diagram of a typical network having a network management station which may be employed in accordance with the present invention.

FIG. 1 shows a typical network 1 incorporating a network management system according to a preferred embodiment of the present invention. The network 1 includes a network management station 3A which incorporates the necessary hardware and software for network management. In particular, the network management station 3A includes a processor, a memory and a disk drive as well as user interfaces such as a keyboard and mouse, and a visual display unit. Network management application software in accordance with the present invention is loaded into the memory of management station 3A for processing data as described in detail below. The network management station 3A is connected by network media links 5 to a plurality of managed network devices including core devices such as network switch 7, hubs 11 and 12, and a router (not shown) which may be managed or unmanaged, and end stations including personal computers (PCs) 3 and workstations. The network may also include unmanaged devices, for example peripheral devices such as printers.

The network management station 3A is capable of communicating with the managed network devices such as network switch 7 and hubs 11 and 12 by means of a network management protocol, in the present embodiment the SNMP protocol, in order to obtain network management data. Each managed device includes a processor which monitors operational characteristics and an SNMP agent which stores the monitored data as MIB data in memory on the device as is well known in the art, including data relating to inter alia data traffic at the device.

An SNMP managed device may monitor data for a number of MIBs. An example of a MIB containing network management data is MIB-II (formerly MIB-I) as specified by the IETF (Internet Engineering Task Force) in specification RFC1213. MIB-II is common to most vendors' core devices and any network management system should preferably be capable of reading and utilising management data from MIB-II. Furthermore, the network management system of the preferred embodiment of the present invention is additionally capable of reading and utilising more complex management data contained in such MIBs as RMON (Remote Monitoring MIB, RFC1271), RMON2 (Remote Monitoring MIB 2, RFC2021), the standard bridge MIB (RFC1493), the standard repeater MIB (RFC1516), or any proprietary MIBs produced by original equipment manufacturers (e.g. the 3Com Remote Poll MIB).

In network 1, hubs 11 and 12 and switch 7 are MIB-II compatible, and switch 7 is also RMON compatible. Other configurations are possible, and contemplated.

In accordance with the preferred embodiment of the present invention, the network management station 3A monitors a plurality of stress metrics. The stress levels or values for the metrics are obtained by periodically requesting relevant MIB-II data from hubs 11 and 12 and switch 7, and RMON data from switch 7, and by periodically polling all network devices using Ping or service requests and monitoring response times.

The network management station 3A compares each monitored stress level against a corresponding predetermined threshold level for the stress metric. Each time a threshold is exceeded, the network management station 3A stores details about the monitored stress level in an Event log in memory. The memory typically stores the Event log data in the form of a database or similar data file, which stores Event data in different time intervals separately. Thus, the database provides a history of Events that have occurred on the network for different time periods. It should be noted that monitored stress levels which do not exceed the threshold are not stored in the Event log, in accordance with the preferred embodiment, and the received data about these monitored levels is discarded or overwritten by subsequent monitored stress levels. It will be appreciated that in other embodiments all monitored stress levels for some or all time intervals may be stored in the database.

A typical Event log is shown in Table 1 below. Each Event listed in the Event log represents a monitored stress level which exceeded the threshold set for the stress metric at the time of the Event.

TABLE 1

| Time | Device Name | Device Type | Description |
| --- | --- | --- | --- |
| 11.06 | HUB10-1-72 | FMS II | Utilisation on port 2 exceeded 80% |
| 11.00 | S1000-1-72 | SWITCH 1000 | Errors on port 24 exceeded 5% |
| 10.58 | S1000-1-72 | SWITCH 1000 | Errors on port 2 exceeded 5% |
| 10.58 | PSH40-1-72 | PSHUB 40 | Broadcasts on port 12 exceeded 200/s |
| 10.57 | HUB10-1-72 | FMS II | Utilisation on port 2 exceeded 80% |
| 10.56 | S1000-1-72 | SWITCH 1000 | Utilisation on port 24 exceeded 80% |

The threshold for each metric is preset to a default value in the network management station 3A and is adjustable by the network administrator. The network administrator conventionally has no means of establishing the appropriate threshold level for the monitored stress metrics to ensure that he or she is informed of all genuine Events, i.e. Events indicative of genuine problems on the network, but is not notified of Events which are not significant for the network concerned.

In accordance with a preferred embodiment of the present invention, the network management station 3A operates a method which uses data obtained during previous monitoring of the network to suggest the optimum value for the threshold level of a stress metric for the network concerned.

Figure 2:
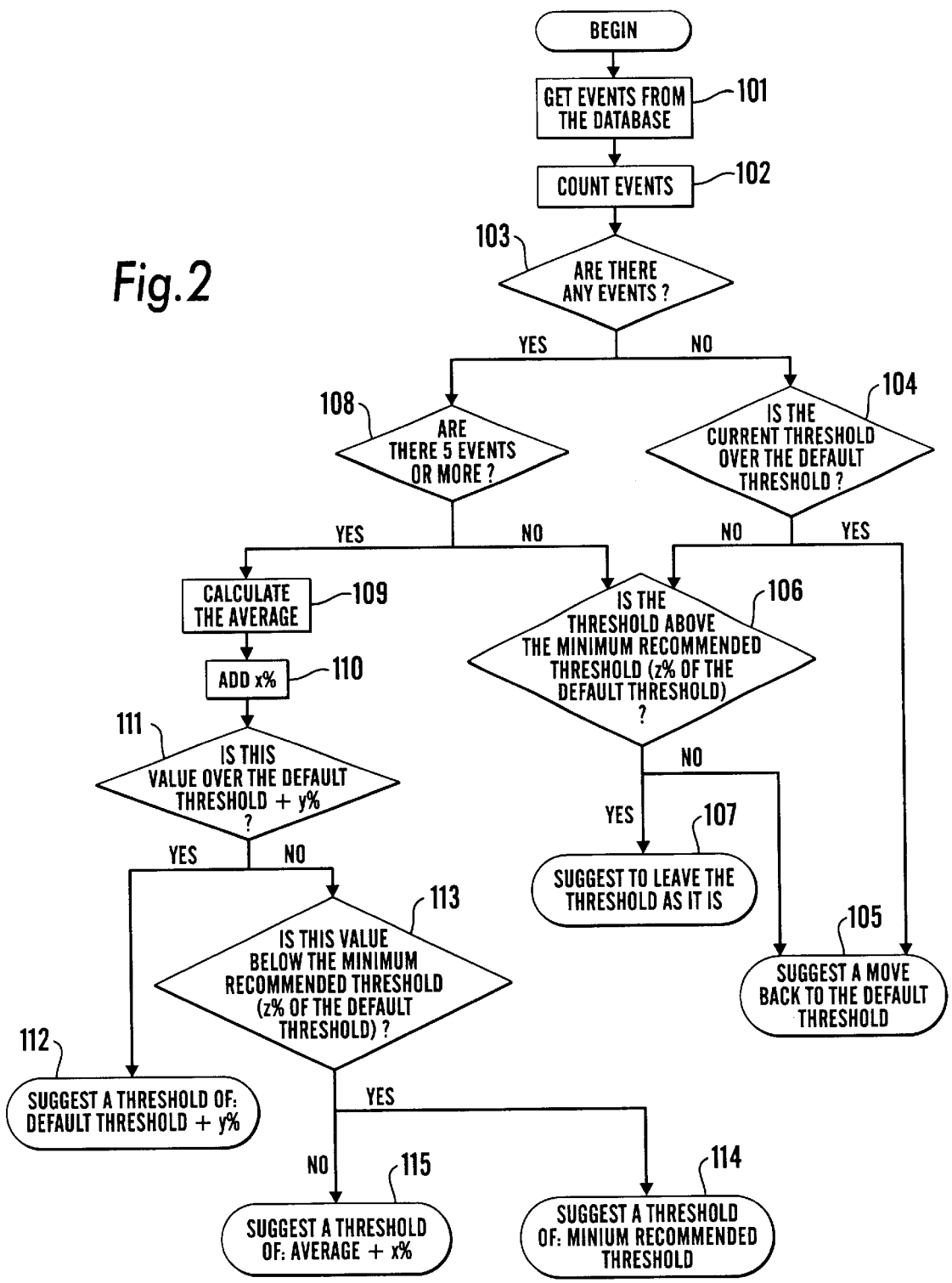
FIG. 2 is a flow chart showing the steps carried out by a computer program implementing a method in accordance with a preferred embodiment of the present invention.

The method of the present invention is preferably implemented in a computer program which is run on the management station 3A. It will be appreciated that the method may be implemented in other forms such as hardware. In accordance with the preferred embodiment, the computer program carries out the steps illustrated in FIG. 2.

As described above, the network management system employed in the present invention monitors stress metrics by retrieving and processing management data from managed network devices, and generates Events when threshold levels for the relevant metrics are exceeded.

For the purposes of the following description it is assumed that the network management station 3A has an Event log stored in a database as described above, which the program of FIG. 2 utilises, as described below.

The program begins when the network administrator runs the part of the management software application to set the threshold level of the stress metrics. It will be appreciated that the program may be initiated automatically at selectable regular time intervals, e.g. once a week, in order to prompt the administrator to optimise the threshold levels.

At step 101 the program retrieves Event data from the database, preferably for a selected time period. In accordance with the preferred embodiment, the selected time period is an immediately preceding time period such as the last 7 days. It will be appreciated that in other embodiments, other time ranges, which need not be immediately preceding, may be selected. The selected time period ideally represents the time interval since the last threshold adjustment was performed. The Event data includes an identifier for each separate Event (this is generated when an Event is logged in the Event log and/or stored in the database, as is well known in the art), the identity of the monitored metric, the value of the monitored metric, which caused the Event and the threshold which the value exceeded.

In the preferred embodiment, the Events for all metrics in the relevant time interval are retrieved at this stage. In other embodiments, the user may select a monitored metric and only events relating to the selected metric may be retrieved and processed.

At step 102 the program counts the number of Events for a selected metric represented in the Event data retrieved by step 101. This is the number of Events occurring in the immediately preceding selected time interval for the monitored metric.

As will be appreciated from the following, the way in which the program proceeds to determine the optimum threshold for the selected monitored metric is dependent upon the number of Events found in step 102.

The program first considers if there are any Events at step 103.

If step 103 determines that there are no Events for the monitored metric, this could suggest that the network is operating well for this metric, and no problems have therefore arisen. Alternatively, it may be that the threshold has been set too high, and the network management station has failed to log values for the metric which represent problems of high stress.

Thus, at step 104 the program compares the "current" threshold value for the monitored stress metric concerned (i.e. the threshold which led to no Events being logged in the relevant time interval) against the "default" threshold for the metric. As previously mentioned, the default value for each threshold is preset, typically by the application vendor, at a level which is expected to be suited to the average network.

If step 104 determines that the current threshold exceeds the default threshold, the threshold may be too high, and the program therefore determines, at step 105, that the optimum threshold level is the default value for the threshold.

The program may then end, or continue for another monitored stress metric.

If step 104 determines that the current threshold is less than or equal to the default threshold, the program continues at step 106 by considering whether the current threshold exceeds the minimum recommended threshold. The minimum recommended threshold is typically expressed as a percentage Z of the default value for each stress metric (e.g. Z=20). Both the value of Z and the default threshold value are specific to the stress metric, and corresponding values are laid down by the application for each monitored stress metric. If no value Z is preset for a stress metric, the program of the preferred embodiment uses a default percentage value defined for all stress metrics (e.g. 20%). If a threshold is set below the minimum recommended threshold, Events are likely to be generated for monitored values which are normal, thus giving the administrator the false impression that the network is stressed.

If step 106 determines that the current threshold is above the minimum recommended threshold, the current threshold is within appropriate parameters and the network is most likely operating well. The program therefore determines, at step 107, that the optimum threshold level is the current threshold level.

The program may then end, or continue for another monitored stress metric.

If step 106 determines that the current threshold is below the minimum recommended threshold, the current threshold is not within appropriate parameters and, although the network is probably operating well (since no Events have been generated that represent normal operation), the program continues with step 105 by determining that the optimum threshold level is the default threshold level.

Again, the program may then end, or continue for another monitored stress metric.

It will be appreciated that, in another embodiment, step 106 may be omitted, so that if step 104 determines that the current threshold is above the default threshold, the program proceeds directly to step 107 and determines that the current threshold does not need to be changed.

Returning now to the situation in which Events are present, i.e. step 103 determines that there was at least one logged Event for the relevant monitored stress metric in the selected time interval.

The program proceeds with step 108 which considers whether there are five or more Events. The integer five is employed in the preferred embodiment as the number of Events which would be expected in a typical 7-day time interval for a network operating normally. However, it will be appreciated that this number is arbitrary and other numbers may be used depending upon the selected time interval and the nature of the stress metric. Typically, for a 7-day time interval, integer values between 3 and 7 may be used, and for other time intervals the number calculated on a pro rata basis.

If step 108 determines that there are fewer than five Events for the monitored metric, this suggests that the network is operating normally and, whilst problems have arisen, the number of occasions is not significant and represents normal network behaviour. This current threshold is likely to be optimal, and, accordingly, in some embodiments the program may simply proceed with step 107.

Alternatively, it is possible that the threshold has been set too low, therefore highlighting situations that should not need attention. Thus, in accordance with the preferred embodiment shown in FIG. 2, the program continues with step 106, as described above, to ensure that the current threshold is within appropriate parameters (i.e. above the minimum recommended threshold). The optimum threshold is then determined as the default threshold or the current threshold depending upon whether the program proceeds from step 106 to step 105 or step 107 respectively.

If there are five or more Events, this could suggest the network is experiencing severe problems or is under more that average stress. Alternatively is may be that the threshold for the monitored metric is too low, thereby generating Events for monitored values which are normal (i.e. represent low stress).

In order to determine which of these situations has arisen, the program calculates the optimal threshold on the basis of the Events under consideration.

Thus, if step 108 determines that there are at least five Events, the program continues with step 109 which, using the Event data retrieved in step 101, calculates the mean average of all the values of the monitored metric which caused the Events. In particular, using the Event data, the program adds together the values of all the Events for the monitored metric and divides the resulting sum by the number of Events determined in step 102. It will be appreciated that other statistical techniques for calculating a statistical average may be employed e.g. a median average may be calculated.

At step 110 the program adds to the average value, calculated in step 109, a metric-specific percentage, which is illustrated as X % where X is dependent on the monitored metric. If X is not preset, in the preferred embodiment, X=5 by default. Thus, in the default situation, the resulting value is equal to 105% of the average value determined in step 109. It will be appreciated that in other embodiments step 110 may be omitted. In the preferred embodiment, step 110 is employed to filter out minor stress conditions as they occur.

The value calculated in step 110 may be used as the new threshold value to reduce the number of Events logged in the future. However, this value should not be used as a new threshold if the excessive number of Events is not because the current threshold is too low but instead is because all the Events in the time interval concerned are genuine and the network has been experiencing severe problems.

To deal with this, in accordance with the preferred embodiment, the program continues with step 111, which compares the value calculated in step 110 with the maximum recommended threshold for the monitored metric. The maximum recommended threshold is a threshold value which, if exceeded, is likely to prevent genuine Events from being generated and logged. The maximum recommended threshold is typically calculated as the default threshold plus Y% of the default threshold value (e.g. 40–90%), where Y is dependent on the stress metric concerned, and may be laid down by the application vendor along with the percentage value Z and the default threshold value for each stress metric. If no maximum recommended threshold of value for Y is preset, the program of the preferred embodiment uses a default percentage value Y% for all stress metrics (e.g.

50%, so that the maximum recommended threshold=150% of the default value).

If the value calculated in step 110 exceeds the maximum recommended threshold, the program continues with step 112 and determines that the optimum threshold is the maximum recommended threshold (default+Y%).

If the value calculated in step 110 is less than or equal to the maximum recommended threshold, the program continues with step 113 by comparing the value calculated in step 110 with the minimum recommended threshold (Z% of the default as described above).

If step 113 determines that the value calculated in step 110 is less than the minimum recommended threshold, the value is too low, and the program continues to step 114 by determining that the optimum threshold value is the minimum threshold value (Z% of the default threshold).

The program may then end, or continue for another monitored stress metric.

Alternatively, if step 113 determines that the value calculated in step 110 is greater than or equal to than the minimum recommended threshold, the value calculated in step 110 is within appropriate boundaries, and the program continues to step 115 by determining that the optimum threshold value is the average value+X% as calculated instep 110.

Again, the program may then end, or continue for another monitored stress metric.

It will be appreciated from above that in accordance with the preferred embodiment, the present invention is implemented in the form of a computer program which may be included on a computer readable medium such as a disk, and which may be loaded in the disk drive of the network management station 3A. The network management station 3A typically comprises a processor, a disk drive, memory, and user interfaces including a display screen, keyboard, mouse, and a printer. The computer program described above is typically loaded onto the network management station using the disk drive and processor runs the program. Alternatively, the computer program may be carried on a computer system having the website of, for example, the supplier of network devices, which permits downloading of the program over the Internet on a carrier wave to the network management station 3A.

It will be appreciated that various modifications and changes may be made to the described embodiments.

For example, whilst the program of the preferred embodiment retrieves Event data for a preceding predetermined time interval, in other embodiments the program could be run in real time by maintaining a counter for each metric and incrementing the counter by one each time an Event for the metric is generated. Each time the counter is incremented, or each time the counter reaches a value which is a multiple of n, where n is an integer greater than one, the program would then be run to determine a new optimum threshold value.

It is intended to include all such variations, modifications and equivalents which fall within the spirit and scope of the present invention as defined in the accompanying claims.

What is claimed is:

1. A method for determining an optimum threshold value for a monitored characteristic of a managed network, the threshold value defining a value for the monitored characteristic above or below which an event is generated, the method comprising the steps of:

for a preceding time period, counting a number of events generated from values for the monitored characteristic, received during the time period, which were above or below an existing threshold value for said monitored characteristic, and determining an optimum threshold value for the monitored characteristic in dependence on the number determined by the counting step.

2. A method as claimed in claim 1, in which the preceding time period is an immediately preceding time period.

3. A method as claimed in claim 1, in which, prior to the step of counting, the method further comprises the step of: retrieving data from a data storage, the data including the values for the monitored characteristic received during the preceding time period.

4. A method as claimed in claim 1, in which, if the number determined by the counting step is zero, the step of determining an optimum threshold value comprises: determining the optimum threshold value as either the existing threshold value or a default threshold value for the monitored characteristic.

5. A method as claimed in claim 4, in which, if the number determined by the counting step is zero, the method further comprises the step of: comparing the existing threshold value with a default threshold value, and, if the existing threshold value exceeds the default threshold value, determining the optimum threshold value as the default threshold.

6. A method as claimed in claim 5, in which, if the existing threshold value is less than the default threshold value, the step of determining an optimum threshold value comprises: determining the optimum threshold value as the existing threshold value.

7. A method as claimed in claim 5, in which, if the existing threshold value is less than the default threshold value, the method further comprises the step of: comparing the existing threshold value with a minimum recommended threshold, and if the existing threshold value is greater than the minimum recommended threshold, determining the optimum threshold value as the existing threshold value, and if the existing threshold value is less than or equal to the minimum recommended threshold, determining the optimum threshold value as the default threshold value.

8. A method as claimed in claim 1, in which, if the number determined by the counting step is less than a predetermined number greater than zero, the step of determining comprises determining the optimum threshold value as the existing threshold value.

9. A method as claimed in claim 1, in which, if the number determined by the counting step is less than a predetermined number greater than zero, the method further comprises the step of: comparing the existing threshold value with a minimum recommended threshold, and, if the existing threshold value exceeds the minimum recommended threshold, determining the optimum threshold value as the existing threshold value, and if the existing threshold is less than or equal to the minimum recommended threshold, determining the optimum threshold value as the default threshold value.

10. A method as claimed in claim 1, in which, if the number determined by the counting step is greater than or equal to a predetermined number greater than zero, the method further comprises the step of: calculating a statistical value based on an average of the values of the monitored characteristic received during the predetermined time interval, and, using said statistical value to determine the optimum threshold value.

11. A method as claimed in claim 10, in which the step of calculating a statistical value includes: determining a mean average by summing said values for the monitored characteristic and dividing the sum by the number determined by the counting step, and adding X% to the mean average, where X is a predetermined value to obtain said statistical value.

12. A method as claimed in claim 10, further comprising the step of comparing the statistical value with a default threshold value plus Y%, where Y is a predetermined value, and, if the statistical value exceeds the default threshold plus Y%, determining the optimum threshold value as the default threshold value plus Y%.

13. A method as claimed in claim 12, in which, if the statistical value is less than or equal to the default threshold plus Y%, determining the optimum threshold value as the statistical value.

14. A method as claimed in claim 12, in which, if the statistical value is less than or equal to the default threshold plus Y%, the method further comprises the step of: comparing the statistical value with a minimum recommended threshold, and, if the statistical value is less than the minimum recommended threshold, determining the optimum threshold value as the minimum recommended threshold, and if the statistical value is greater than or equal to the minimum recommended threshold, determining the optimum threshold value as the statistical value.

15. A computer readable medium comprising a computer program for carrying out the method as claimed in claim 1.

16. A computer readable medium including a computer program for determining an optimum threshold value for a monitored characteristic of a managed network, the threshold value defining a value for the monitored characteristic above or below which an event is generated, the program comprising:

a program step for counting a number of events generated from values for the monitored characteristic that were received during a preceding time period and that were above or below an existing threshold value for said monitored characteristic, and a program step for determining an optimum threshold value for the monitored characteristic in dependence on the number determined by the program step for counting.

17. A network management apparatus for monitoring a network and for determining an optimum threshold value for a monitored characteristic of the network, the threshold value defining a value for the monitored characteristic above or below which an event is generated, the apparatus comprising:

a processor configured to count the number of events generated from values for a monitored characteristic which were above or below an existing threshold value for said monitored characteristic, said values received during a preceding time period, and configured to determine an optimum threshold value for the monitored characteristic in dependence on the number determined by the counting step.

18. An apparatus as claimed in claim 17, in which the processor is further configured to retrieve management data from the network, the management data including values for the monitored characteristic.

19. An apparatus as claimed in claim 18, further comprising memory for storing the retrieved management data.

* * * * *